United States Patent
Devoe et al.

(10) Patent No.: US 12,394,151 B1
(45) Date of Patent: Aug. 19, 2025

(54) ANOMALY AND CHANGE DETECTION IN 3D ROADWAY MODELS

(71) Applicant: Bentley Systems, Incorporated, Exton, PA (US)

(72) Inventors: Scott Devoe, New London, NH (US); Nicholas Woodfield, Sherman, CT (US)

(73) Assignee: Bentley Systems, Incorporated, Exton, PA (US)

( * ) Notice: Subject to any disclaimer, the term of this patent is extended or adjusted under 35 U.S.C. 154(b) by 161 days.

(21) Appl. No.: 18/379,924

(22) Filed: Oct. 13, 2023

(51) Int. Cl.
*G06T 17/05* (2011.01)
*G06T 17/20* (2006.01)

(52) U.S. Cl.
CPC .............. *G06T 17/05* (2013.01); *G06T 17/20* (2013.01)

(58) Field of Classification Search
None
See application file for complete search history.

(56) References Cited

U.S. PATENT DOCUMENTS

| | | | |
|---|---|---|---|
| 2021/0150692 A1* | 5/2021 | Dickman | G06F 18/2148 |
| 2021/0248390 A1* | 8/2021 | Liang | G06V 20/588 |
| 2024/0078750 A1* | 3/2024 | Liu | G06T 7/11 |
| 2024/0203083 A1* | 6/2024 | Zhu | G06V 10/757 |

OTHER PUBLICATIONS

Ammar, Ashtarout, et al., "Departments of Transportation Efforts to Digitize Ancillary Transportation Asset Data: A Step Toward Digital Twins," National Academy of Sciences: Transportation Research Board, TRR, Transportation Research Record, Sage Journals, May 13, 2023, pp. 1-18.

Kim, Jin-Soo, et al., "Extraction of Geometric Information on Highway Using Terrestrial Laser Scanning Technology," The International Archives of the Photogrammetry, Remote Spatial Information Sciences, vol. XXXVII, Part B5, Beijing 2008, pp. 539-544.

Mitchell, Alexa, "Quality Management for 3D Model-Based Project Development and Delivery," National Academy of Sciences, National Academies Sciences, Engineering, and Medicine, NCHRP 10-113 [Active], Transportation Research Board, Retrieved from the Internet: <https://apps.trb.org/cmsfeed/TRBNetProjectDisplay.asp?ProjectID=5145>, Aug. 18, 2022, pp. 1-2.

(Continued)

*Primary Examiner* — Peter Hoang
(74) *Attorney, Agent, or Firm* — Cesari and McKenna, LLP; James A. Blanchette

(57) ABSTRACT

In example embodiments, anomaly and change detection software of a cloud-based design review service is provided for detecting anomalies and/or changes in 3D roadway models. The software analyzes the constituent meshes of the 3D roadway model that represent components and extracts template drops at locations along a horizontal alignment to produce an ordered list of template drops. The software then looks to differences in depths, widths, cross slopes and/or other geometric properties manifest in individual template drops, or between preceding/subsequent template drops of the ordered list, to detect anomalies and/or changes. Indications of the components associated with the detected anomalies and/or changes are displayed in a visualization of the 3D roadway model in a user interface.

20 Claims, 17 Drawing Sheets

(56) References Cited

OTHER PUBLICATIONS

Mitchell, Alexa, et al., "Transportation Agencies Shift Toward Digital Delivery," ASCE, American Society of Civil Engineers, retrieved from the Internet: <https://www.asce.org/publications-and-news/civil-engineering-source/civil-engineering-magazine/issues/magazine-issue/article/2023/03/transportation-agencies-shift-toward-digital-delivery#:~:text=After%20reviewing%20projects%20that%20used,itself%20within%20a%20few%20years.>, Mar. 1, 2023, pp. 1-9.

U.S. Appl. No. 17/687,097, filed Mar. 4, 2022 by Nicholas Woodfield, et al. for Techniques for Extracting and Displaying Superelevation Data From 3D Roadway Models, pp. 1-30.

\* cited by examiner

ANOMALY AND CHANGE DETECTION IN 3D ROADWAY MODELS

BACKGROUND

Technical Field

The present disclosure relates generally to infrastructure modeling, and more specifically to improved techniques for detecting anomalies and/or changes in three-dimensional (3D) roadway models as part of validating the models.

Background Information

In the design, construction and/or maintenance of infrastructure it is often desirable to create infrastructure models using infrastructure modeling software. An infrastructure model may be a built infrastructure model (BIM) or digital twin of infrastructure. A BIM is a digital representation of infrastructure as it should be built, providing a mechanism for visualization and collaboration. A digital twin is a digital representation of infrastructure as it is actually built, and is often synchronized with information representing current status, working conditions, position, or other qualities. One type of infrastructure model is a three-dimensional (3D) roadway model. A 3D roadway model typically consists of a number polygon roadway meshes (or simply "meshes"), including one or more top-surface meshes representing the top surface of the roadway (e.g., the pavement surface), and other meshes (e.g., curb meshes, aggregate meshes, etc.) that represent other (e.g., side and sub-surface) components of the roadway.

The meshes of a 3D roadway model may be constructed in infrastructure modeling software by combining a horizontal and vertical alignment with cross-sectional templates. The horizontal alignment describes the path of the roadway in an x-y plane. The vertical alignment describes the elevation of the top surface of the roadway along a z-axis. The cross-sectional templates are transversely oriented two-dimensional (2D) drawings that describe the anatomy of the roadway. The cross-sectional templates are "dropped" or placed along the horizontal and vertical alignments at intervals, and therefore are commonly referred to as "template drops." Such template drops typically define the edges of polygons that make up the polygon meshes (e.g., the top-surface meshes and other meshes) of the 3D roadway model.

Prior to utilizing a 3D roadway model to guide construction, maintenance, or other tasks, it is typically necessary to validate the model to identify and correct any "anomalies." In this context, "anomalies" refer to artifacts or errors that cause a 3D roadway model to not accurately reflect the actual design of the roadway. Examples of anomalies may include gaps, overlaps, discontinuities, and the like that are unintentionally introduced during construction of the 3D roadway model. Likewise, prior to utilizing a 3D roadway model it is often necessary to produce construction documentation describing where intended changes in components occur. In this context, "intended changes" or simply "changes" refer to intentional alterations in the size or arrangement of components of the roadway that are part of the design of the roadway. Examples of changes that may require documentation may include changes in thickness of a component, a single component splitting into two, a component ending, and the like. To ensure all necessary construction documentation has been generated, it is often desirable to identify change locations.

However, it is typically difficult for users of infrastructure modeling software to detect anomalies and/or changes in 3D roadway models. Because of the long linear aspect of 3D roadway models, in a 3D view it is often difficult to see much of the model at any given time. Likewise, various layers of the model may obscure other layers in a 3D view, making it difficult to perceive anomalies and/or changes. As such, manually detecting anomalies and/or changes directly in 3D roadway models can be extremely slow and error prone. While a user may attempt to convert a 3D roadway model to another form and detect anomalies and/or changes in such other form, this may add further complications and again may rely upon slow and error prone manual review.

Accordingly, there is a need for improved techniques for detecting anomalies and/or changes in 3D roadway models as part of validating the models.

SUMMARY

In example embodiments, anomaly and change detection software of a cloud-based design review service is provided for efficiently detecting anomalies and/or changes in 3D roadway models. The software analyzes the constituent meshes of the 3D roadway model that represent components, and extracts template drops at locations along a horizontal alignment to produce an ordered list of template drops. The software then looks to differences in depths, widths, cross slopes and/or other geometric properties manifest in individual template drops, or between preceding/subsequent template drops of the ordered list, to detect anomalies and/or changes. Indications of the components associated with the detected anomalies and/or changes are displayed in a visualization of the 3D roadway model in a user interface. The software may allow users to validate 3D roadway models quickly with low error rate, addressing the deficiencies of prior manual review schemes.

In one example embodiment, a method for detecting anomalies and/or changes in a 3D roadway model is provided. Software executing on one or more computing devices extracts a plurality of template drops from the 3D roadway model at locations along a horizontal alignment to produce an ordered list of template drops. The software constructs for each template drop on the ordered list a graph indicating adjacency between components whose cross sections are represented in the template drop. For each template drop of the ordered list, the software determines components that have inconsistent depth in the template drop by comparing distance between top and bottom line segments of components and flags components that have inconsistent depth. The software expands the graph to also indicate adjacency of components between template drops by matching the components of each template drop with components in a preceding template drop or a subsequent template drop of the ordered list and identifying any continuation of components. The software determines gaps or overlaps between adjacent components indicated in the graph by comparing line segments of adjacent components, and flagging components with line segments that differ in geometry by more than a threshold amount or lack overlapping line segments. The software displays a visualization of the 3D roadway model including indications of the flagged components.

In another embodiment, a non-transitory computing device readable medium having instructions stored thereon is provided. The instructions when executed by one or more computing devices are operable to extract a plurality of template drops from a 3D roadway model at locations along a horizontal alignment to produce an ordered list of template drops, and to construct a graph indicating adjacency between components whose cross sections are represented in the template drop. The instructions when executed are further operable to expand the graph to also indicate adjacency of components between template drops by matching the components of each template drop with components in a preceding template drop or a subsequent template drop of the ordered list and identify any continuation of components. The instructions when executed are further operable to determine gaps or overlaps between adjacent components indicated in the graph by comparing line segments of adjacent components, and flagging components with line segments that differ in geometry by more than a threshold amount or lack overlapping line segments. The instructions when executed are still further operable to display a visualization of the 3D roadway model including indications of the flagged components.

In yet another embodiment, a computing device is provided that is configured to detect anomalies and/or changes in a 3D roadway model. The computing device includes a processor and a memory coupled to the processor, the memory configured to maintain anomaly and change detection software. The software is configured to extract a plurality of template drops from the 3D roadway model at locations along a horizontal alignment to produce an ordered list of template drops. The software is further configured to, for each template drop of the ordered list, determine components that have inconsistent depth in the template drop by comparing distance between top and bottom line segments of components, and flagging components that have inconsistent depth. The software is further configured to expand the graph to also indicate adjacency of components between template drops by matching the components of each template drop with components in a preceding template drop or a subsequent template drop of the ordered list and identify any continuation of components. The software is further configured to determine gaps or overlaps between adjacent components indicated in the graph by comparing line segments of adjacent components, and flagging components with line segments that differ in geometry by more than a threshold amount or lack overlapping line segments. The software is further configured to display a visualization of the 3D roadway model including indications of the flagged components.

It should be understood that a wide variety of additional features and alternative embodiments may be implemented other than those discussed in this Summary. This Summary is intended simply as a brief introduction to the reader for the further description that follows and does not indicate or imply that the examples mentioned herein cover all aspects of the disclosure or are necessary or essential aspects of the disclosure.

BRIEF DESCRIPTION OF THE DRAWINGS

The description below refers to the accompanying drawings of example embodiments, of which.

DETAILED DESCRIPTION

The following detailed description describes example embodiments. Any references to items in the singular should be understood to include items in the plural, and vice versa, unless explicitly stated or otherwise clear from the context. Grammatical conjunctions are intended to express any and all disjunctive and conjunctive combinations of conjoined clauses, sentences, words, and the like, unless otherwise stated or clear from the context. For example, the term "or" should be understood to mean "and/or." Any recitations of ranges of values are not intended to be limiting, are provided as examples only, and are not intended to constitute a limitation on the scope of the described embodiments. Further, any recitation of ranges should be interpreted as referring individually to any and all values falling within the range, unless otherwise indicated, and each separate value within such the range should be treated as if it were individually recited. Terms of approximation such as "about," "approximately," "substantially" or the like, should be construed as referring to an allowance for deviation that is appreciated by one of ordinary skill in the art. Terms of relative ordering or orientation, such as "first," "last," "greatest", "lowest", "top," "bottom," and the like, should be understood to be used relative to a standard of comparison or perspective, and do not preclude differing orderings or orientations based on different standards of comparison or perspectives. No language in the description should be construed as indicating an element is a necessary or essential aspect of the disclosure.

Figure 1:
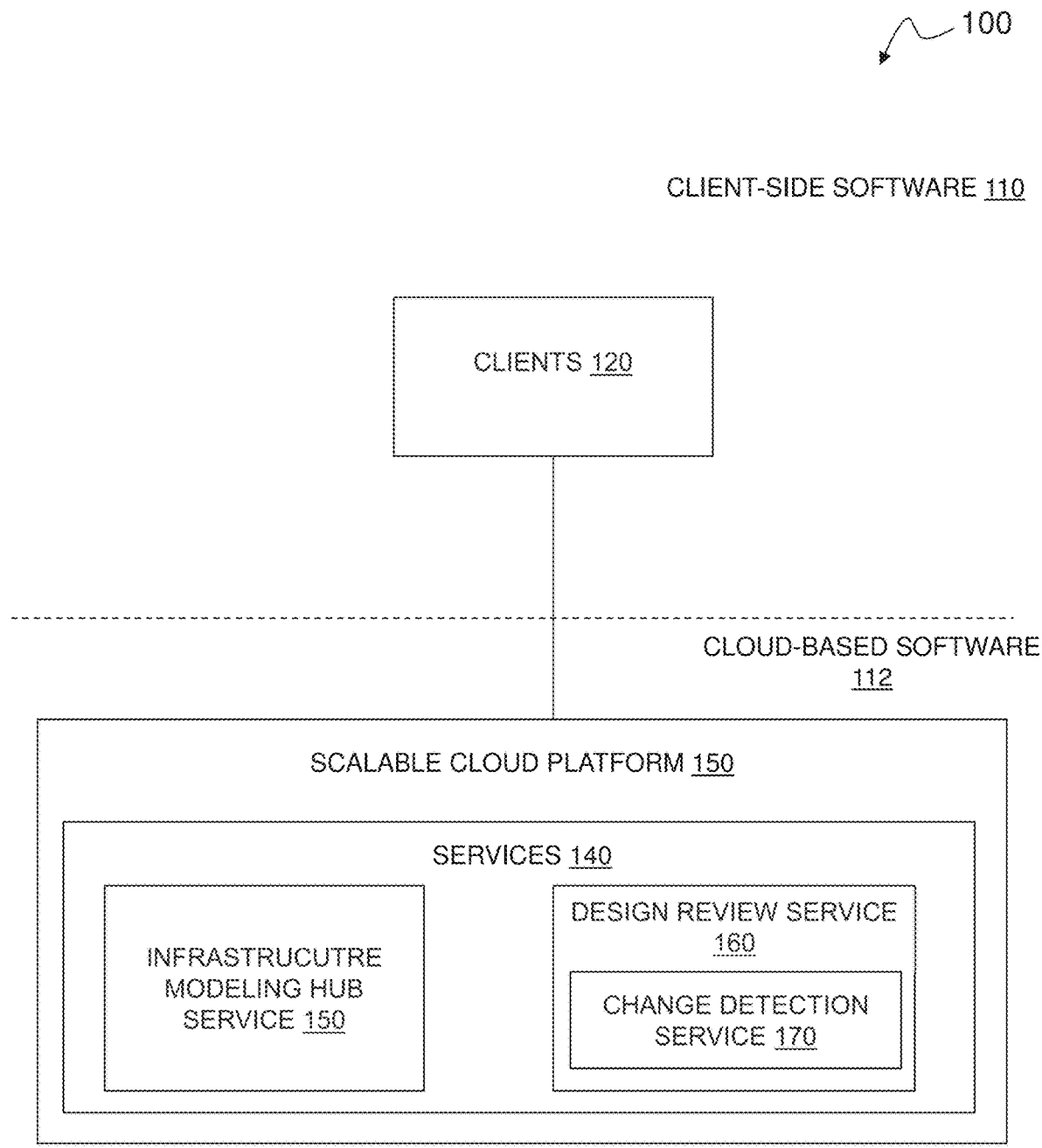
FIG. 1 is a high-level block diagram of an example software architecture in which improved techniques for extracting and displaying superelevation data from 3D roadway models may be implemented.

FIG. 1 is a high-level block diagram of an example software architecture in which improved techniques for extracting and displaying superelevation data from 3D roadway models may be implemented. The architecture may be divided into client-side software 110 executing on one or more computing devices arranged locally (collectively "client devices") and cloud-based services software 112 executing on one or more remote computing devices ("cloud computing devices") accessible over the Internet. Each computing device may include processors, memory/storage, a display screen, and/or other hardware (not shown) for executing software, storing data and/or displaying information. The client-side software 110 may include client software (or simply "clients") 120 operated by users. The clients 120 may be of various types, including desktop clients that operate directly under an operating system of a client device and web-based clients that operate within a web browser. The clients 120 may be concerned mainly with providing user interfaces and interacting with the application program interfaces (APIs) of cloud-based services that perform more computing resource intensive tasks.

The cloud-based software 112 may include a scalable cloud platform (e.g., an iTwin® platform) 130 that provides APIs and libraries to support cloud based software services (or simply "services") 140 that interact with the clients 120 to enable users to create, modify, view, analyze, simulate and/or otherwise interact with infrastructure models, including 3D roadway models.

The scalable cloud platform (e.g., iTwin® platform) 130 may include an infrastructure modeling hub service (e.g., an iModelHub™ service) 150 that functions as a control center for infrastructure models (including 3D roadway models), coordinating concurrent access and changes resulting in different versions. To accomplish this, the infrastructure modeling hub service 150 may maintain briefcases and a set of accepted changesets in a repository. When services 140/clients 120 desire to operate upon an infrastructure model they may obtain a briefcase from a repository closest to the desired state, and those accepted changesets from the repository that when applied bring that briefcase up to the desired state. When services 140/clients 120 make a change, they may create a local changeset that represents pending changes. Subsequently, the local changeset may be pushed back to the infrastructure model hub service to be added to the set of accepted changesets.

The services 140 may include a design review service (e.g., an iTwin Design Review™ design review and project coordination service) 160. The design review service 160 may include software for discipline-specific reviews of infrastructure models (including 3D roadway models), permitting coordination of trades and authorization of data for release. In an application tailored for roadway design, construction and/or maintenance, the design review service 160 may include discipline-specific software for analyzing 3D roadway models and displaying on a client 120 the models and related analysis. The design review service may include software for performing various types of analysis, including anomaly and change detection software 170 for detecting anomalies and/or changes in 3D roadway models.

Figure 2A:
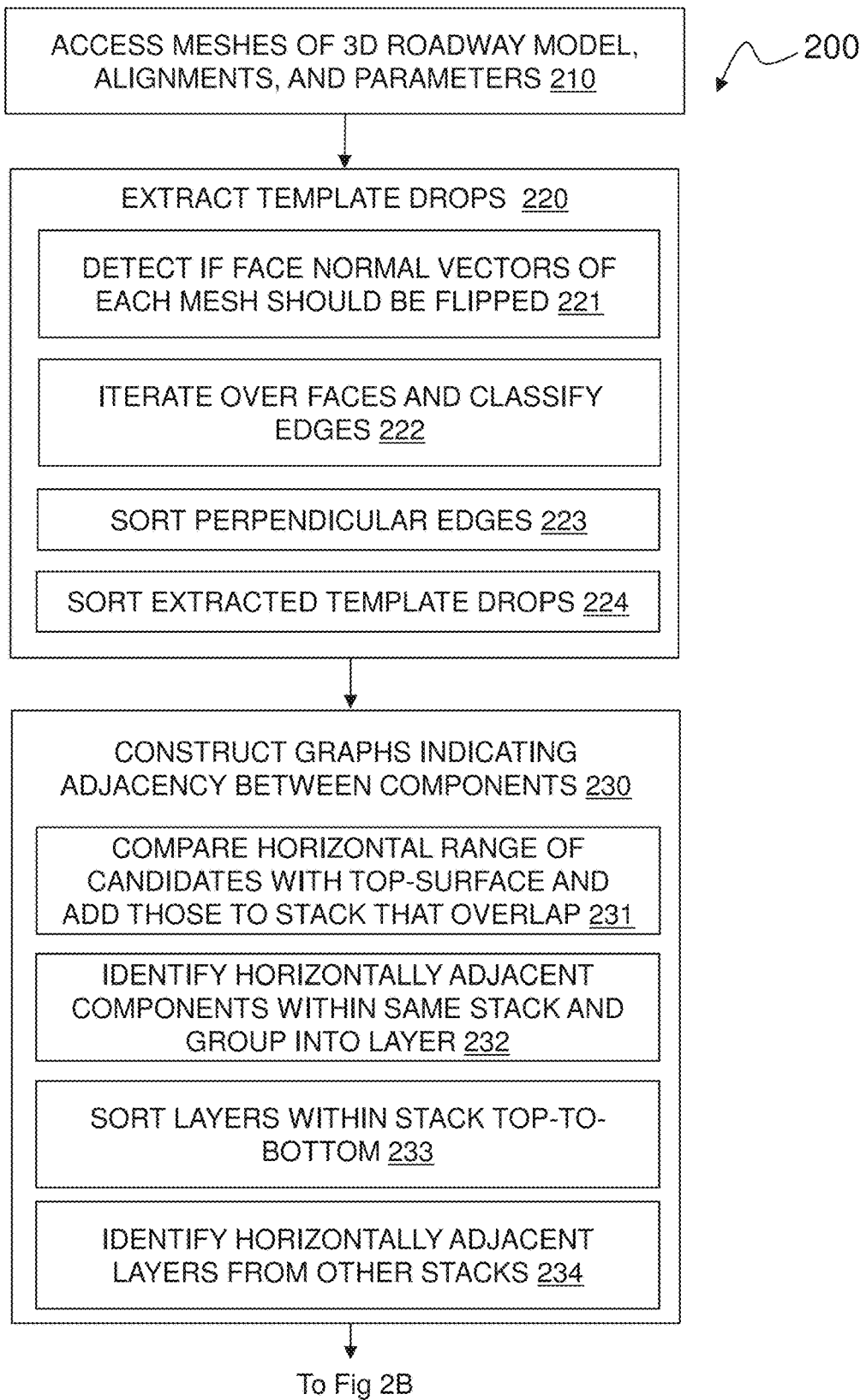
FIGS. 2A and 2B are a flow diagram of an example sequence of steps that may be executed by anomaly and change detection software to detect anomalies and/or changes in 3D roadway models.
Figure 2B:
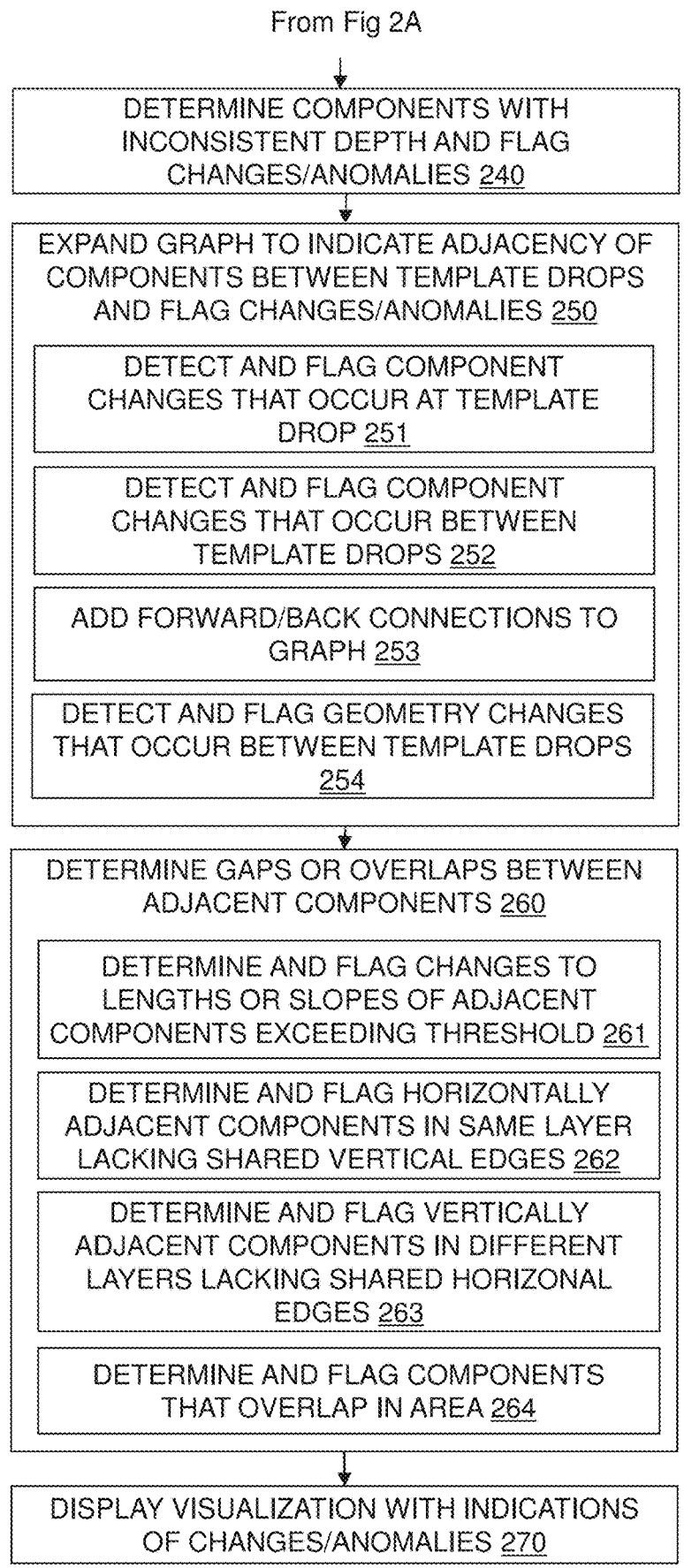

FIGS. 2A and 2B are a flow diagram of an example sequence of steps 200 that may be executed by anomaly and change detection software 170 to detect anomalies and/or changes in 3D roadway models. The sequence of steps 200 may be triggered in response to user input in the user interface of a client 120 in communication with the anomaly and change detection software 170.

At step 210, the anomaly and change detection software 170 accesses meshes of a 3D roadway model, alignments, and parameters. The meshes may include top-surface meshes representing the top surface of the roadway (e.g., the pavement surface) and other meshes (e.g., curb meshes, aggregate meshes, etc.) that represent other (e.g., side and sub-surface) components of the roadway. The alignments may include a horizontal alignment and optionally a vertical alignment. The parameters may include identifications of the top-surface components, a dot product tolerance threshold, a horizontal search threshold, an adjacency gap threshold, a minimum vertical slope, a change detection threshold, among other parameters. The parameters may be provided by a user in the user interface of the client 120, may be set to default values, or may be otherwise configured. In one implementation, the horizontal search threshold may have a default value of 80%, the adjacency gap threshold may have a default value of 6 inches (approximately 15 centimeters), the minimum vertical slope may have a default value of 15%, and the change detection threshold may have a default value of one millimeter for lengths and 1% for slopes.

At step 220, the anomaly and change detection software 170 extracts template drops from the 3D roadway model at locations along the horizontal alignment to produce an ordered list of template drops. Each template drop may be extracted by determining edges of polygons of the meshes at the location that are perpendicular to the horizontal alignment, and then processing and sorting those edges to produce line segments that represent the respective components of the roadway.

Figure 3:
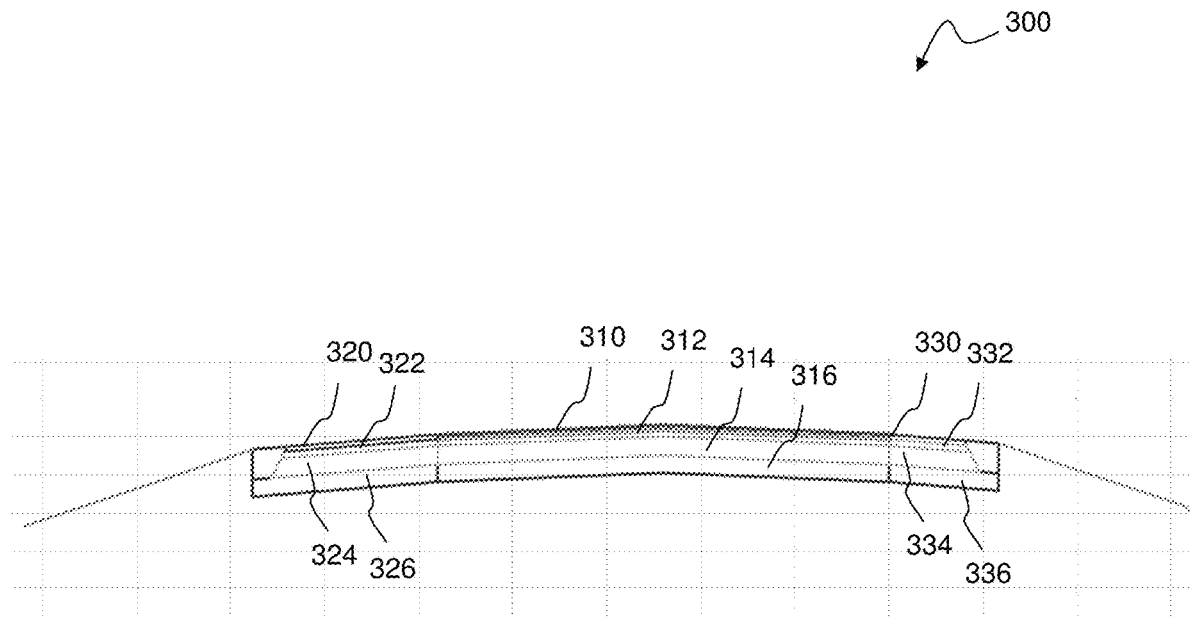
FIG. 3 is a diagram of an example template drop that may be extracted.

FIG. 3 is a diagram 300 of an example template drop that may be extracted as part of step 220. The template drop includes line segments that represent a top-surface component (here, travel-way pavement) 310 derived from a top-surface mesh, as well as line segments that represent other components 312-336, such as curbs, aggregate, etc. derived from respective meshes. While many components have top and bottom line segments, some components (e.g., grading or ditches) may have only top line segments as their respective meshes are open planar elements. Many components also have side line segments that represent the horizontal extent of the components.

While FIG. 3 shows components with perfect horizontal and vertical adjacency (i.e., there are no gaps or overlaps between top and bottom line segments of components above/below each other, or side line segments of components to the left/right of each other), it should be understood that this may not always be the case. Due to anomalies a given template drop may include gaps or overlaps that are not shown in FIG. 3.

Step 220 may be broken down into a number of sub-steps that perform individual tasks. At sub-step 221, the anomaly and change detection software 170 detects if face normal vectors of each mesh should be flipped (i.e., inverted). A mesh may be composed of faces having a normal vector indicating the direction the face is oriented. These faces may be arranged into closed shapes. One problem is that a mesh may have inconsistent windings (e.g., all the faces of the mesh may have normal vectors pointing inward where a convention may be for normal vectors to be pointed outward). In this sub-step, a check is performed for inconsistent windings and, if detected, the direction of face normal vectors is flipped (inverted).

At sub-step 222, the anomaly and change detection software 170 may iterate over every face of each mesh and classify its edges. The software 170 may determine if any face has edges that are substantially perpendicular to the horizontal alignment. This may be performed by finding a closest point on the horizontal alignment and testing if a dot product between the edge and the horizontal alignment is tangent within the dot product tolerance threshold.

At sub-step 223, the anomaly and change detection software 170 sorts the substantially perpendicular edges using a closest point on the horizontal alignment as a reference point. As part of sub-step 223, the software 170 may discard duplicate edges by detecting edges that overlap. The software 170 may normalize edge start and stop points to be specified in a predetermined direction (e.g., always left-to-right) and may sort edges in an order according to predetermined directions (e.g., left-to-right and top-to-bottom). At this point, the edges may be considered to be line segments within an extracted template drop.

At sub-step 224, the anomaly and change detection software 170 sorts extracted template drops by their location along the horizontal alignment to produce an ordered list of template drops.

At step 230, the anomaly and change detection software 170 constructs for each template drop a graph indicating adjacency between components whose cross sections are represented in the template drop, using the identifications of the top-surface components. The goal is to identify a stack of components in the template drop under each top surface component, and for each stack to identify horizontally adjacent layers in the template drop from other stacks.

Figure 4:
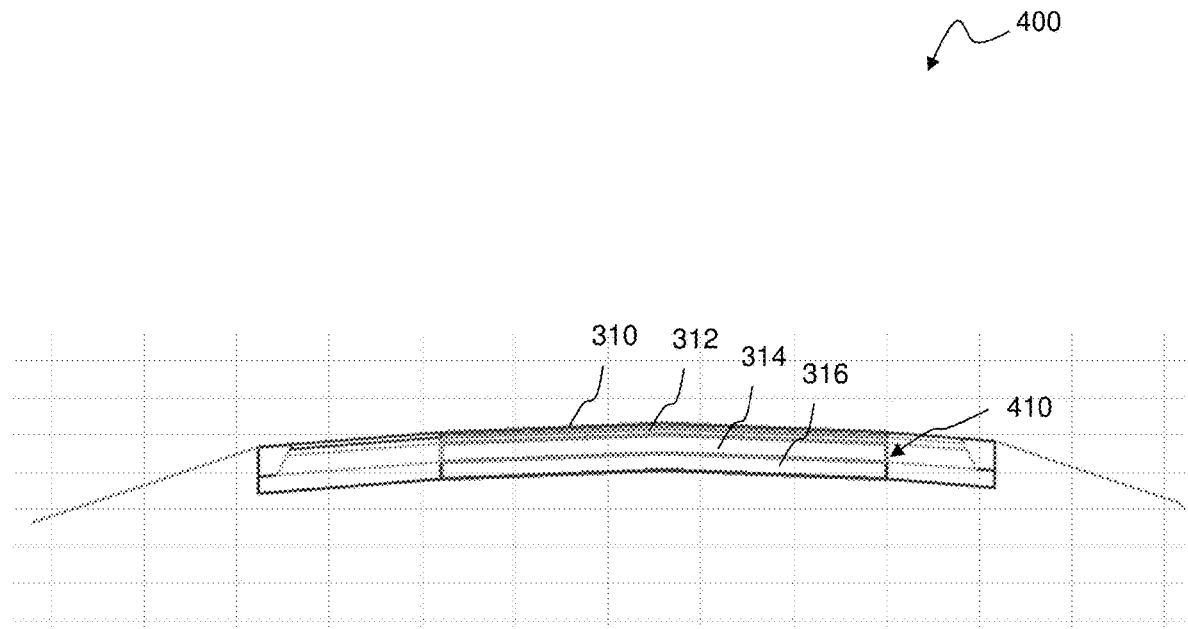
FIG. 4 is a diagram of the example template drop from FIG. 3, showing a stack of components under the top surface component.

FIG. 4 is a diagram 400 of the example template drop from FIG. 3, showing a stack 410 of components 310-316 under the top surface component 310. The stack 410 includes a number of layers arranged between a top layer (made up of the top surface component 310) and a bottom layer (made up of bottom surface component 316).

Step 230 may be broken down into a number of sub-steps that perform individual tasks. At sub-steps 231-235, for each template drop, the anomaly and change detection software 170 identifies a stack of components in the template drop under each top surface component that includes a number of layers. Specifically, at sub-step 231 the software 170 calculates the horizontal range of the top-surface component. At sub-step 232, the software 170 calculates the horizontal range of other components of the template drop that are candidates for the stack.

Figure 5:
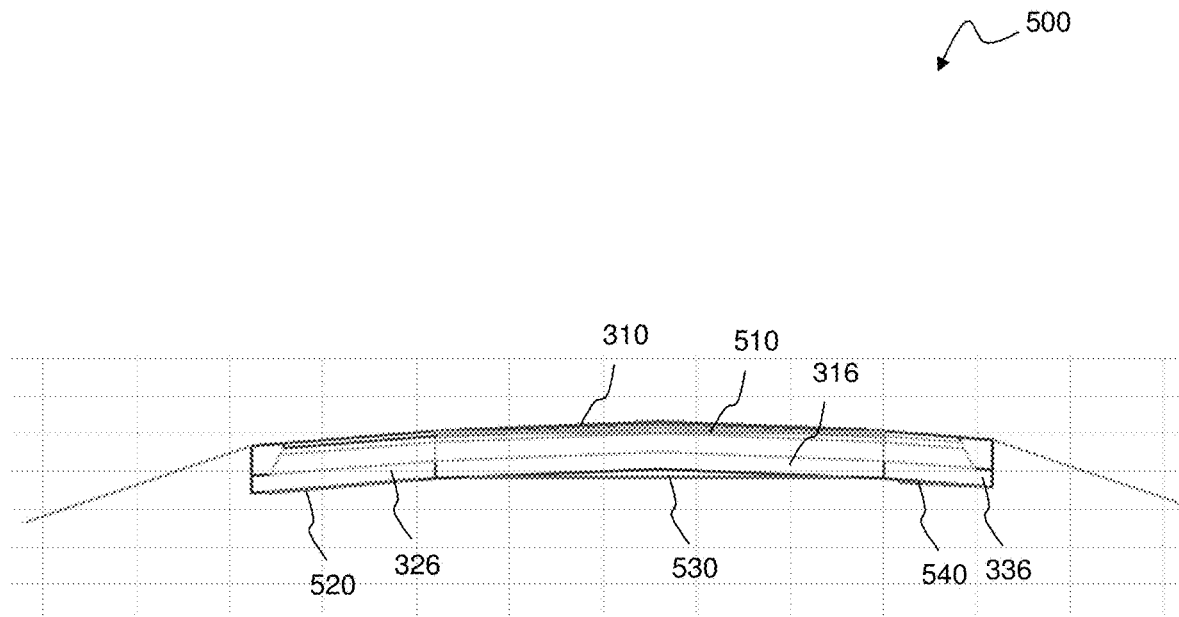
FIG. 5 is a diagram of the example template drop from FIG. 3, showing a first line that represents horizontal range of the top-surface component and additional lines that represent horizontal range of bottom components that are candidates for the stack.

FIG. 5 is a diagram 500 of the example template drop from FIG. 3, showing a first line 510 that represents horizontal range of the top-surface component 310 and additional lines 520, 530, 540 that represent horizontal range of bottom surface components 326, 316, 336 that are candidates for the stack.

At sub-step 231, the software 170 compares the horizontal range of candidate components for the stack with the horizontal range of the top-surface component and adds candidates to the stack that overlap by at least the horizontal search threshold. The horizontal search threshold may ensure that components that overlap only a minimal amount are ignored. When a candidate component is added to a stack it may be removed from consideration as a candidate for the stacks under any other top-surface components in the template drop.

At sub-step 232, the software 170 identifies horizontally adjacent components within the same stack. If they exist, they are grouped into a single layer within the stack and sorted (e.g., left-to-right). This may be performed by detecting components that have side line segments (e.g., identified as line segments whose slope is greater than the minimum vertical slope) that overlap (e.g., identified by projecting the side line segments onto infinite lines corresponding to the other component and determining a parameterized range overlaps) and that are proximate each other (e.g., identified by a separation distance being less than or equal to the adjacency gap threshold).

Figure 6:
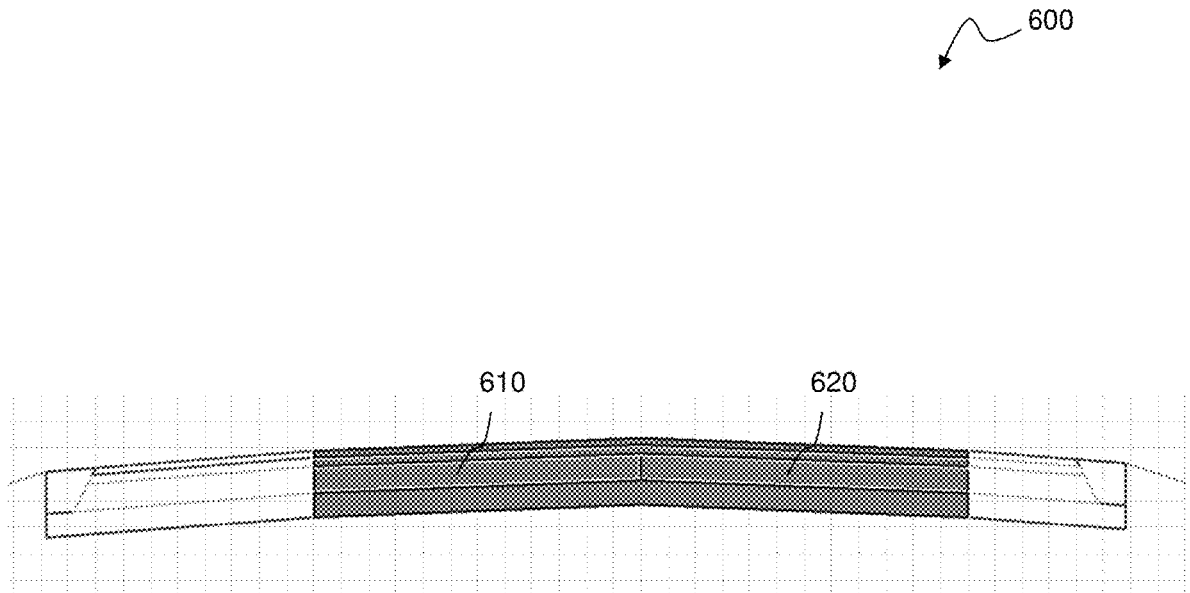
FIG. 6 is a diagram of a slightly modified version of the example template drop from FIG. 3, showing identified horizontally adjacent components within the same stack.

FIG. 6 is a diagram 600 of a slightly modified version of the example template drop from FIG. 3, showing identified horizontally adjacent components 610, 620 within the same stack. The third layer from the top surface component includes two components 610, 620 adjacent to each other.

At sub-step 233, the anomaly and change detection software 170 sorts layers within the stack top-to-bottom by comparing maximum/minimum z-axis values of the components Then, at sub-steps 234, the anomaly and change detection software 170, for each layer of each stack, identifies horizontally adjacent layers in the template drop from other stacks. This may be performed similar to sub-step 232 by detecting components that have side line segments (e.g., identified as line segments whose slope is greater than the minimum vertical slope) that overlap (e.g., identified by projecting the side line segments onto infinite lines corresponding to the other component and determining a parameterized range overlaps) and that are proximate each other (e.g., identified by a separation distance being less than or equal to the adjacency gap threshold).

Figure 7A:
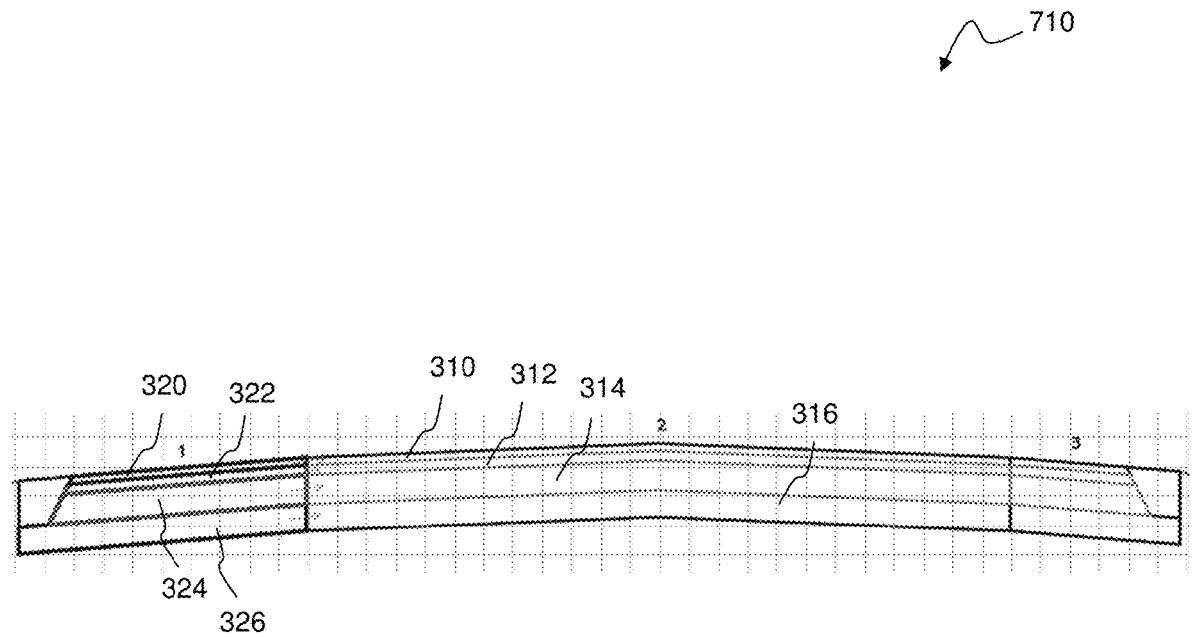
FIGS. 7A and 7B are a pair of diagram of the example template drop from FIG. 3, showing identified horizontally adjacent layers in the template drop from other stacks.
Figure 7B:
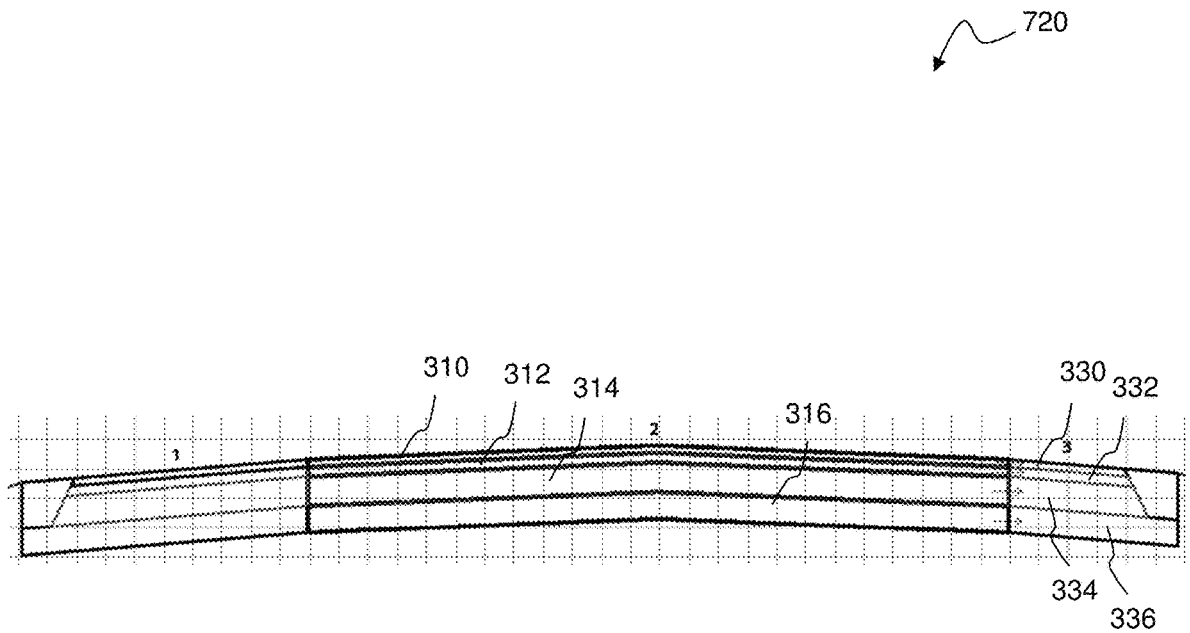

FIGS. 7A and 7B are a pair of diagram 710, 720 of the example template drop from FIG. 3, showing identified horizontally adjacent layers in the template drop from other stacks. In FIG. 7A, components 310-316 of stack 2 are identified as being in horizontally adjacent layers to the components 320-326 of stack 1. In FIG. 7B, components 330-336 of stack 3 are identified as being in horizontally adjacent layers to the components 310-316 of stack 2.

Figure 8:
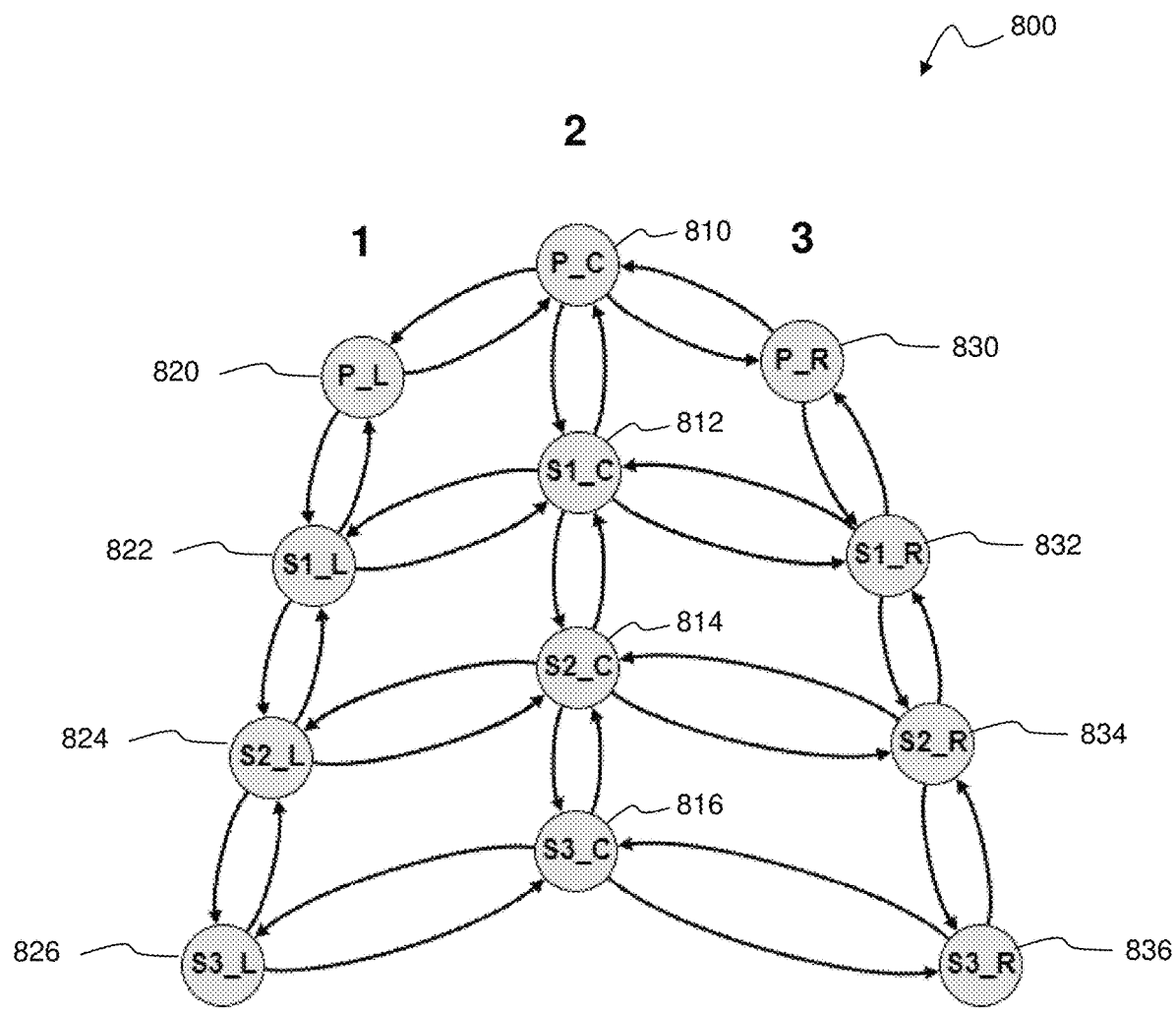
FIG. 8 is a graph of the example template drop from FIG. 3, with nodes representing components arranged in stacks and arrows indicating vertical and horizontal adjacency.

The result of sub-steps 231-234 of step 230 is a description of the adjacency between components in the template drop which may be maintained as a graph. FIG. 8 is a graph 800 of the example template drop from FIG. 3, with nodes 810-836 representing components 310-326 arranged in stacks 1-3 and arrows indicating vertical and horizontal adjacency.

At step 240, the anomaly and change detection software 170 determines for each template drop components that have inconsistent depth by comparing distance between top and bottom line segments of components, and flagging components that have inconsistent depth (e.g., are not within a tolerance of each other). Inconsistent depth may be an indicia of an anomaly. The determination may be applied to those components that have top and bottom line segments. At each of a number of points (e.g., endpoints or inflection points) along a top line segment, the software 170 may perform a downward ray-line intersection test against the bottom line segments, and at each of a number of points (e.g., endpoints or inflection points) along the bottom line segment, the software 170 may perform an upward ray-line intersection test against the top line segments. Distances to intersection are determined, and if they are not within a tolerance of each other across the component, the component is flagged as containing an anomaly.

Figure 9A:
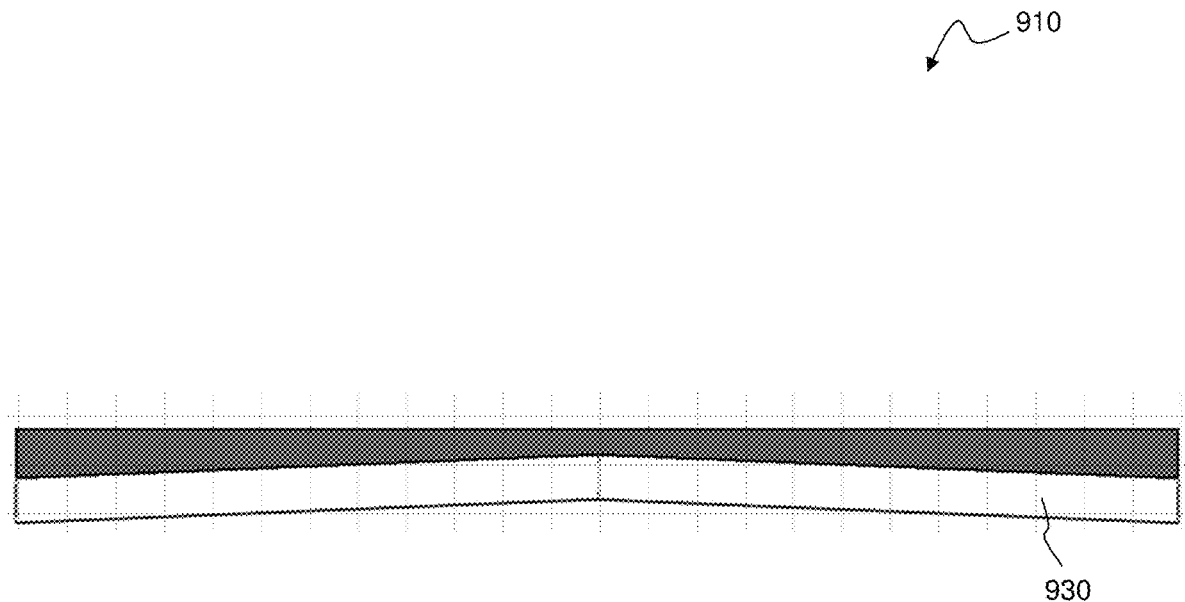
FIGS. 9A and 9B are a pair of diagrams showing calculation of depth of components by comparing distance between top and bottom line segments of components.
Figure 9B:
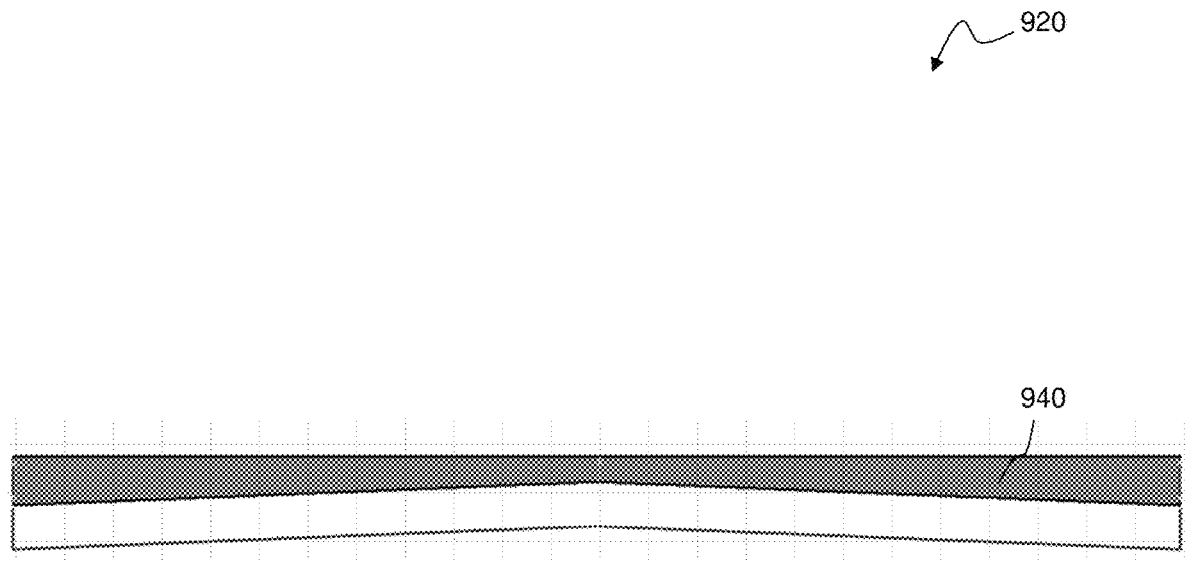

FIGS. 9A and 9B are a pair of diagrams 910, 920 showing calculation of depth of components by comparing distance between top and bottom line segments of components. FIG. 9A shows a calculation for a bottom component 930, with arrows indicating locations where ray-line intersection tests are performed and depth calculated. The bottom component 930 has consistent depth, so the distances will be within a tolerance of each other. FIG. 9B shows a calculation for a top component 930, with arrows indicating locations where ray-line intersection tests are performed and depth calculated. The top component 940 has inconsistent depth due to the inverted v-shape of the bottom line segment, while the top line segment is straight. As can be seen, the depth at the center arrow is substantially less than the depth at the other arrows.

At step 250, the anomaly and change detection software 170 expands the graph to also indicate adjacency of components between template drops by matching the components of each template drop with components in a preceding template drop or a subsequent template drop and identifying any continuations of components. As part of this operation, the software 170 may also flag changed or anomalous components. In 3D roadway models lanes that make up a pavement surface or other features may be modeled as separate meshes that can start or stop at locations along a horizontal alignment. These locations require documentation and are also common locations of anomalies (e.g., if the starting or stopping meshes do not properly align with each other).

Step 250 may be broken down into a number of sub-steps that perform individual tasks. Sub-steps 251-254 may determine if there have been any component changes, create appropriate connections in the graph to indicate adjacency between starting and stopping components of the component changes, and flag components associated with the component changes. Specifically, at sub-step 251, the anomaly and change detection software 170 detects and flags component changes that occur at a template drop by comparing the components at each template drop and identifying components whose line segments substantially overlap. In a well-designed 3D roadway model, mesh changes will typically occur at a given template drop, with a component stopping and one or more (e.g., 2) components starting, or vice versa. The components whose line segments substantially overlap the line segments of a component may be identified as a continuation of that component. In the case of a mere component change, the flag may be a change flag that simply indicates the change may require documentation. In the case of a change that causes a gap, the flag may indicate presence of an anomaly that indicates correction may be required to the 3D roadway model.

Figure 10:
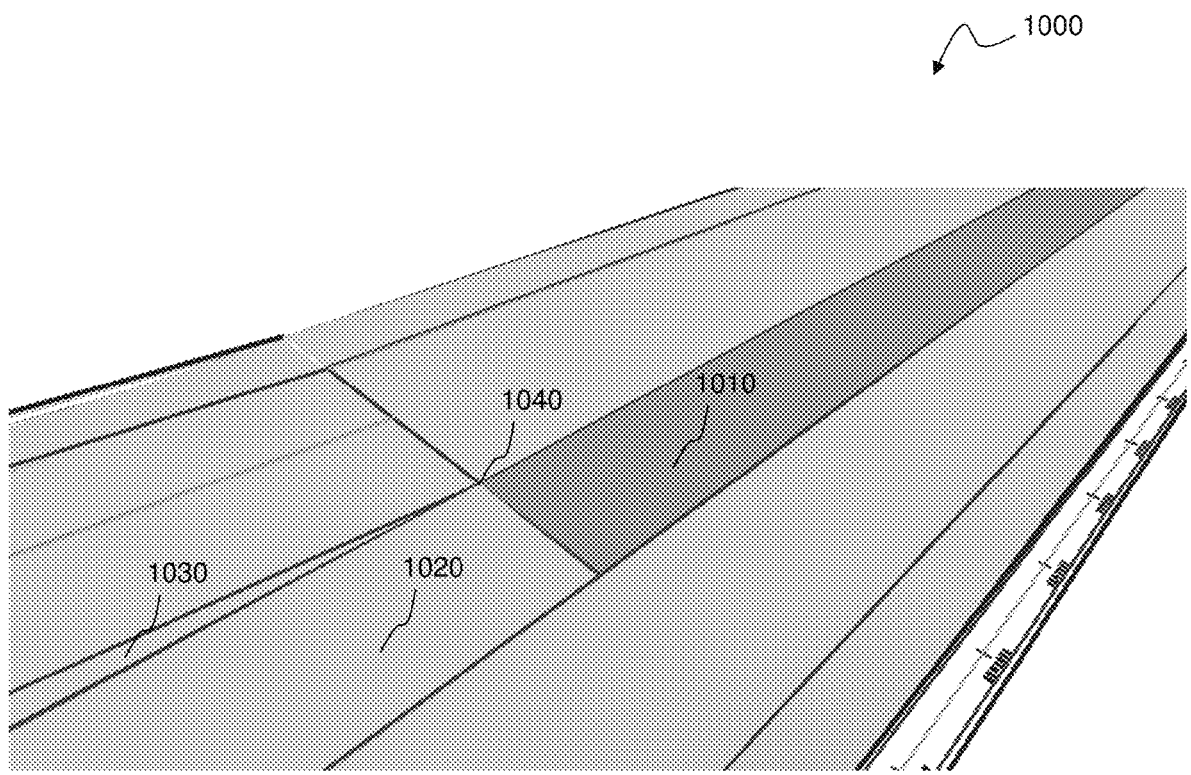
FIG. 10 is a view of a 3D roadway showing a component change in a well-designed 3D roadway model.

FIG. 10 is a view 1000 of a 3D roadway showing a component change in a well-designed 3D roadway model. Top-surface component 1010 abuts another top-surface component 1020 that is a continuation of the pavement surface of the lane. This change and the continuation may be identified by sub-step 251. It should be noted that, as shown in FIG. 10, components may transition to/from a single point, such as component 1030 transitioning from component 1010 at point 1040.

At sub-step 252 the anomaly and change detection software 170 detects component changes that occur between template drops by translating line segments of components at each template drop to a preceding template drop of the ordered list or a subsequent template drop of the ordered list, and identifying components whose line segments substantially overlap. In a poorly designed 3D roadway model, changes to components may occur between different template drops, such that there is a horizontal gap between components. The components whose line segments have the greatest overlap upon the projected line segments of a component may be identified as a continuation of that component. If no component with overlapping line segments can be identified, such that a component abruptly start or stops, it may be concluded that a vertical gap exists. In the case of a mere change, the flag may be a change flag that simply indicates the change may require documentation. In the case of a change that causes a gap, the flag may indicate presence of an anomaly that indicates correction may be required to 3D roadway model.

Figure 11:
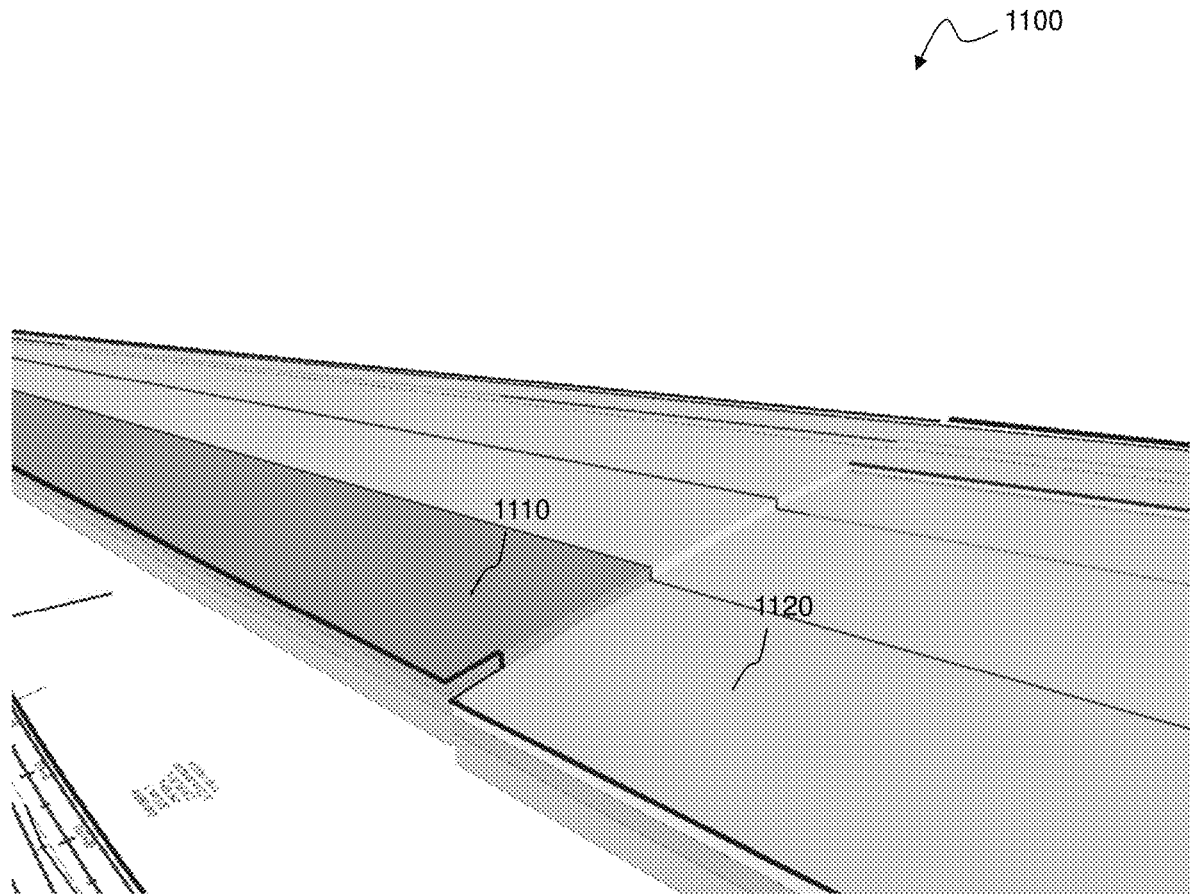
FIG. 11 is a view of a 3D roadway showing a component change in a poorly designed 3D roadway model that includes a gap.

FIG. 11 is a view 1100 of a 3D roadway showing a component change in a poorly designed 3D roadway model that includes a gap. Top-surface component 1110 stops but there is no continuation with substantially overlapping line segments because component 1120 is disposed significantly below it, resulting in a vertical gap between meshes. This gap may be identified by sub-step 252.

At sub-step 253, for each component that is a continuation of another component identified in steps 251 and 252, the anomaly and change detection software 170 adds forward/back connections to the graph to indicate the adjacency.

At sub-step 254, the anomaly and change detection software 170 detects and flags geometry changes that occur between template drops by comparing components of each template drop with adjacent components in a preceding template drop of the ordered list or a subsequent template drop of the ordered list, and adds a change flag for components associated with the geometry changes that occur between template drops. The comparison may include width, cross-slope, elevation and/or depth of the top line segment of components that are from the same mesh or the mesh of a continuation component, as determined in sub-step 253.

At step 260, the anomaly and change detection software 170 determines gaps or overlaps between adjacent components indicated in the graph by comparing line segments of adjacent components, and flagging components with line segments that differ in geometry by more than a threshold amount or lack overlapping line segments. This step may operate as an integrity check to validate the relationship between adjacent components that were discovered in earlier steps.

Figure 12:
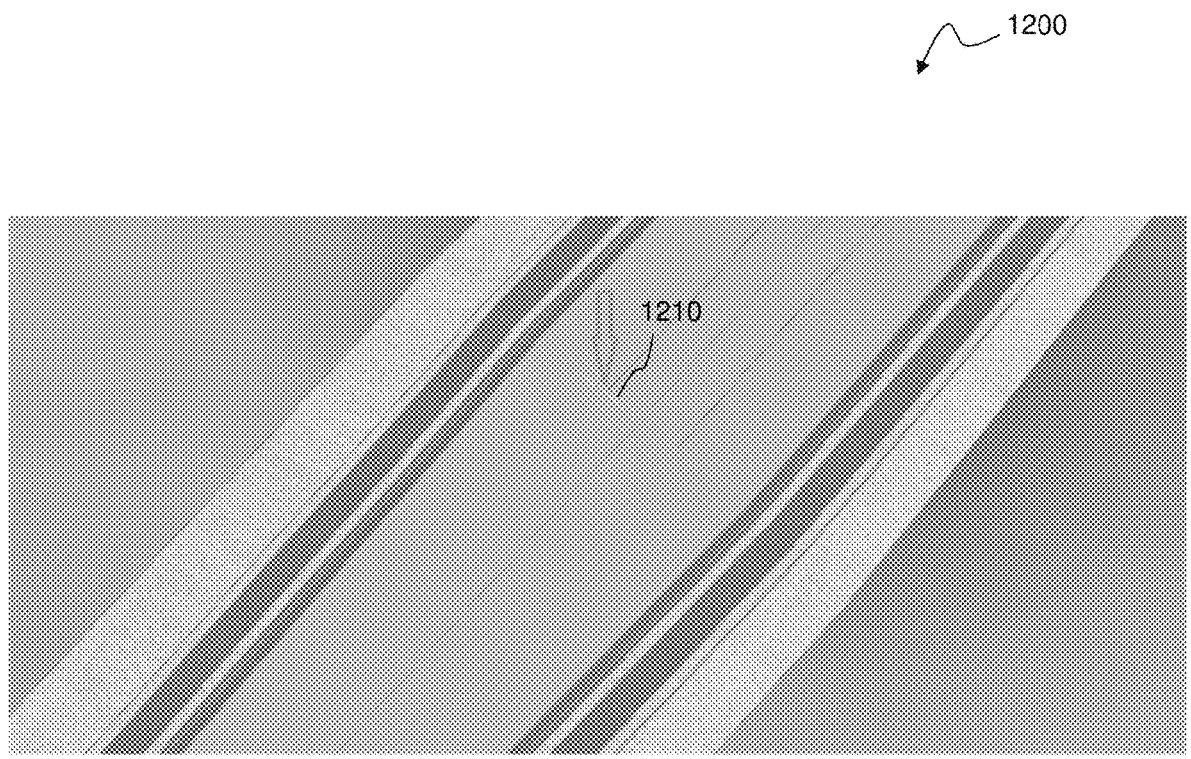
FIG. 12 is a view of a 3D roadway showing a gap between meshes of adjacent top-surface components.

FIG. 12 is a view 1200 of a 3D roadway showing a gap 1210 between meshes of adjacent top-surface components. The roadway transitions from narrow to wide lanes, but the meshes do not touch at the location of the transition. This gap may be identified by step 260.

Step 260 also include a number of sub-steps that perform additional integrity checks. At sub-step 261, the anomaly and change detection software 170 determines changes to lengths or slopes of line segments of adjacent components indicated in the graph that exceed the change detection threshold, and flags components with changes that exceed the change detection threshold. Transitions may be expected to occur gradually over a span of multiple drops. An abrupt change may be indicative of an anomaly.

Figure 13:
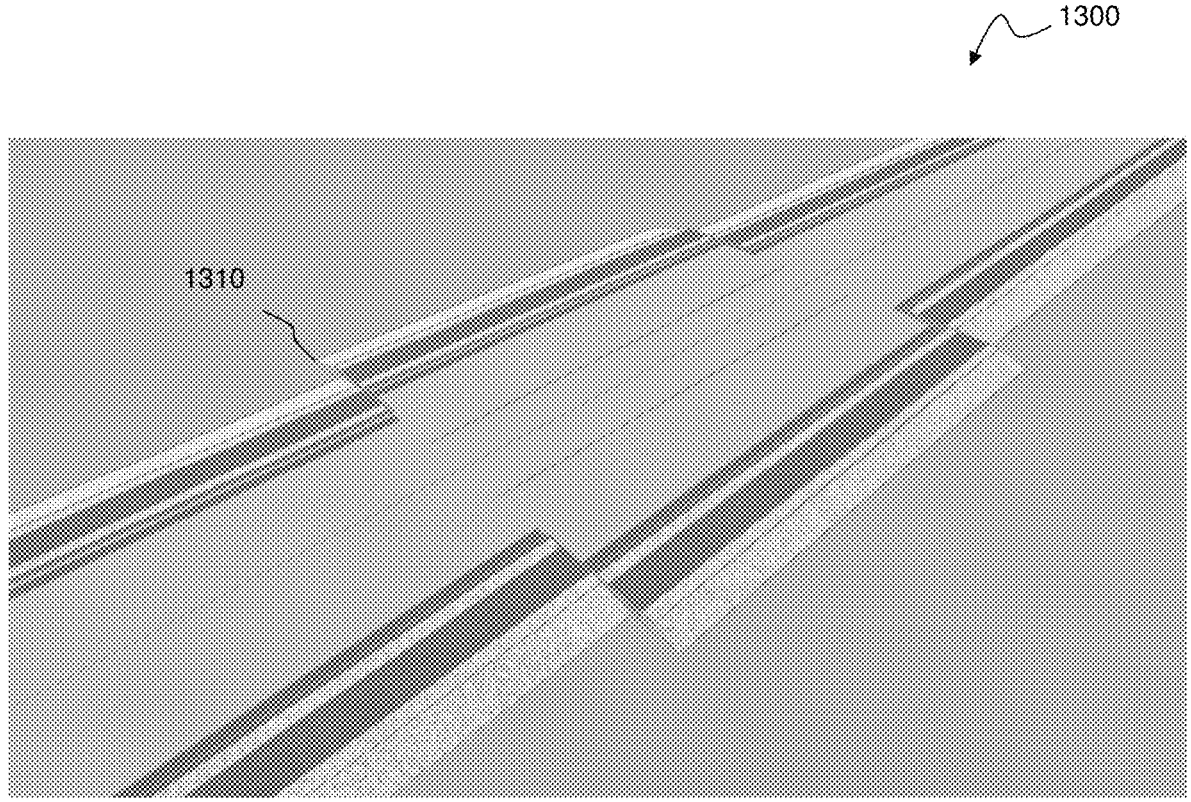
FIG. 13 is a view of a 3D roadway showing an abrupt change between the meshes of adjacent top-surface components.

FIG. 13 is a view 1300 of a 3D roadway showing an abrupt change 1310 between the meshes of adjacent top-surface components. The lengths of the horizontal line segments of adjacent components abruptly increases by a significant amount. This abrupt change may be identified by sub-step 261.

At sub-step 262, the anomaly and change detection software 170 determines components in the same layer that are horizontally adjacent but lack overlapping or shared vertical edges. Components that lack overlapping or shared vertical edges may be flagged as associated with an anomaly.

At sub-step 263, the anomaly and change detection software 170 determines components in different layers that are vertically adjacent but lack overlapping or shared horizontal edges. Components that lack overlapping or shared horizontal edges may be flagged as associated with an anomaly.

At sub-step 264, the anomaly and change detection software 170 determines components that overlap area of another component. Components that overlap the area of another component may be flagged as associated with an anomaly.

At step 270, the anomaly and change detection software 170 displays in a user interface a visualization of the 3D roadway model including indications of the flagged components associated with anomalies and/or changes. The indications may include highlighting or other visual indicia. Different colors, textures, or other markings may distinguish between a detected anomaly (that typically requires correction) and a change (that typically only requires documentation). Tables or lists of anomalies and/or changes may also be displayed in the user interface.

Figure 14:
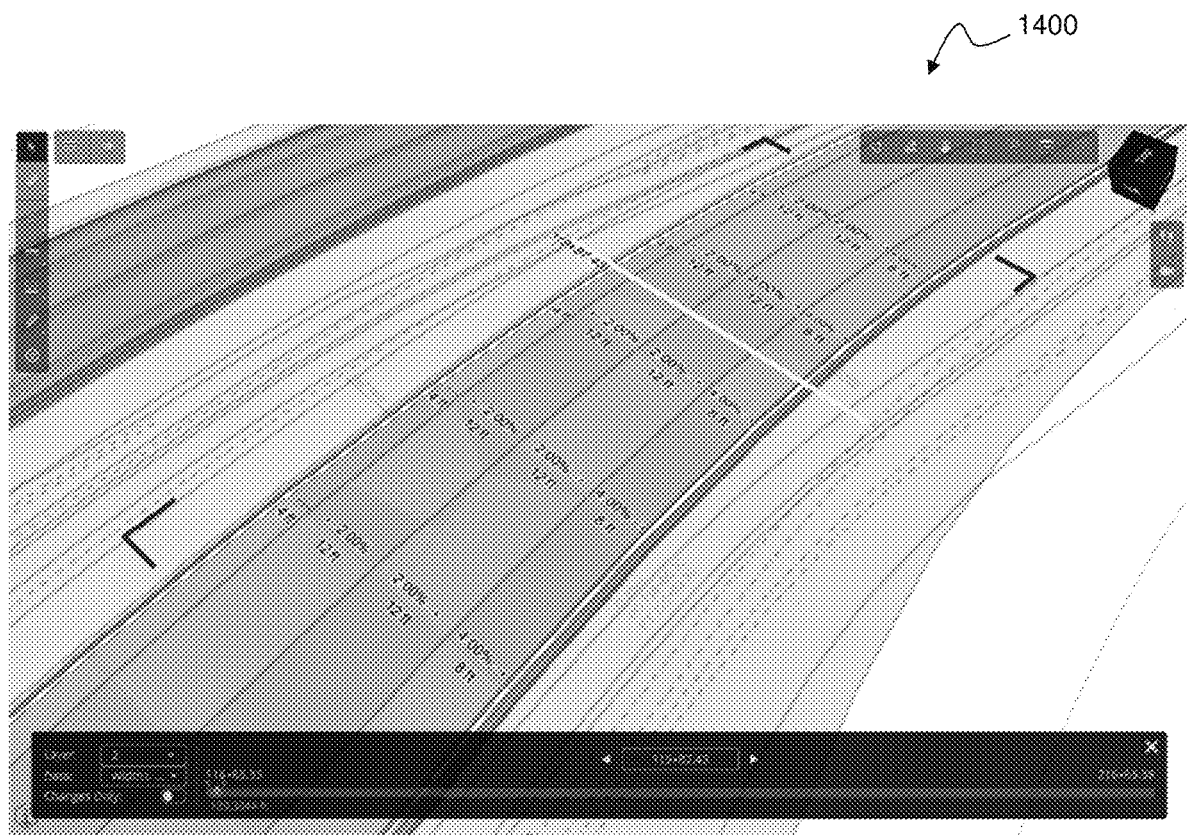
FIG. 14 is an example visualization of a 3D roadway model in which indications of detected anomalies and/or changes may be displayed.

FIG. 14 is an example visualization 1400 of a 3D roadway model in which indications of detected anomalies and/or changes may be displayed. The user may be permitted to filter which layers of the 3D roadway model and which types of anomalies and/or changes are shown. Further, geometry and other data extracted by the anomaly and change detection software 170 may also be displayed, responsive to user filtering. Here, width/cross slopes of line segments are displayed.

In conclusion, the above described anomaly and change detection software 170 may efficiently detect anomalies and/or changes in 3D roadway models and display results in a user interface. While it is described above that functionality may be implemented in a specific manner by software on specific hardware, it should be understood that the functionality may also be implemented by different manners by different software on different hardware. Software may include instructions in a high-level programming language or low-level programming language that may be stored and compiled or interpreted to run on hardware. For example, instructions may be stored on a non-transitory electronic device readable medium and when executed on one or more processors is operable to implement the functionality.

It should be understood that the ordering of any method steps discussed above may be changed to suit various situations or requirements. Absent an explicit indication to the contrary, the order of steps described above may be modified such that a subsequent step occurs before a preceding step, or in parallel to such step.

Above all, it should be understood that the above descriptions are meant to be taken only by way of example. Numerous variations, additions, omissions, and other modifications will be apparent to one of ordinary skill in the art, and such variations, additions, omissions, and other modifications should be considered within the scope of this disclosure. Thus, while example embodiments are shown and described, it will be apparent to those skilled in the art that changes and modifications may be made therein without departing from the spirit and scope of this disclosure.

What is claimed is:

1. A method detecting anomalies and/or changes in a three-dimensional (3D) roadway model, comprising:
   extracting, by software executing on one or more computing devices, a plurality of template drops from the 3D roadway model at locations along a horizontal alignment to produce an ordered list of template drops;
   constructing, by the software for each template drop on the ordered list, a graph indicating adjacency between components whose cross sections are represented in the template drop;
   determining, by the software for each template drop of the ordered list, components that have inconsistent depth in the template drop by comparing distance between top and bottom line segments of components, and flagging components that have inconsistent depth;
   expanding, by the software, the graph to also indicate adjacency of components between template drops by matching the components of each template drop with components in a preceding template drop or a subsequent template drop of the ordered list and identifying any continuation of components;
   determining, by the software, gaps or overlaps between adjacent components indicated in the graph by comparing line segments of adjacent components, and flagging components with line segments that differ in geometry by more than a threshold amount or lack overlapping line segments; and
   displaying, by the software, a visualization of the 3D roadway model including indications of the flagged components.

2. The method of claim 1, further comprising:
   determining, by the software, component changes, creating connections in the graph to indicate adjacency between starting and stopping components of the component changes, and flagging components associated with the component changes.

3. The method of claim 2, wherein the determining component changes further comprises:
   detecting component changes that occur at a template drop by comparing the components at each template drop and identifying components whose line segments substantially overlap; and
   detecting component changes that occur between template drops by translating line segments of components at each template drop to a preceding template drop of the ordered list or a subsequent template drop of the ordered list, and identifying components whose line segments substantially overlap.

4. The method of claim 1, further comprising:
   determining, by the software, geometry changes that occur between template drops by comparing components of each template drop with adjacent components in a preceding template drop of the ordered list or a subsequent template drop of the ordered list, and flagging components associated with the geometry changes.

5. The method of claim 1, wherein the constructing the graph further comprises:
   for each top surface component, identifying a stack of components in the template drop under the top surface component, the stack of components including a plurality of layers;
   for each layer of each stack, identifying horizontally adjacent layers in the template drop from other stacks.

6. The method of claim 5, wherein the identifying the stack of components comprises:
   calculating horizontal range in the template drop of the top surface component;
   calculating horizontal range in the template drop of each of a plurality of candidate components; and
   adding candidate components having horizontal range that overlaps horizontal range of the top surface component to the stack by at least a horizontal search threshold.

7. The method of claim 6, wherein the identifying the stack of components further comprises:
   for each added component of the stack, searching for horizontally adjacent components within the stack;

grouping horizontally adjacent components that are within a horizontal search threshold into a layer; and sorting layers of the stack from a layer that includes the top surface component to a layer that includes a bottom surface component.

8. The method of claim 1, wherein the determining gaps or overlaps between adjacent components indicated in the graph further comprises:

determining, by the software, changes to lengths or slopes of line segments of adjacent components indicated in the graph that exceed a change detection threshold, and flagging components with changes that exceed the change detection threshold.

9. The method of claim 1, wherein the determining gaps or overlaps between adjacent components further comprises:

determining components in a same layer that are horizontally adjacent lack overlapping or shared vertical edges.

10. The method of claim 1, wherein the determining gaps or overlaps between adjacent components further comprises:

determining components of different layers that are vertically adjacent lack overlapping or shared horizontal edges.

11. The method of claim 1, wherein the determining gaps or overlaps between adjacent components further comprises:

determining components that overlap area of another component.

12. A non-transitory computing device readable medium having instructions stored thereon, the instructions when executed by one or more computing devices operable to:

extract a plurality of template drops from the three-dimensional (3D) roadway model at locations along a horizontal alignment to produce an ordered list of template drops;

construct a graph indicating adjacency between components whose cross sections are represented in the template drop;

expand the graph to also indicate adjacency of components between template drops by matching the components of each template drop with components in a preceding template drop or a subsequent template drop of the ordered list and identify any continuation of components;

determine gaps or overlaps between adjacent components indicated in the graph by comparing line segments of adjacent components, and flagging components with line segments that differ in geometry by more than a threshold amount or lack overlapping line segments; and display a visualization of the 3D roadway model including indications of the flagged components.

13. The non-transitory computing device readable medium of claim 12, wherein the instructions when executed are further operable to:

for each template drop of the ordered list, determine components that have inconsistent depth in the template drop by comparing distance between top and bottom line segments of components, and flag components that have inconsistent depth.

14. The non-transitory computing device readable medium of claim 12, wherein the instructions that are operable to construct the graph comprise instructions that when executed are operable to:

for each top surface component, identify a stack of components in the template drop under the top surface component, the stack of components including a plurality of layers; and for each layer of each stack, identify horizontally adjacent layers in the template drop from other stacks.

15. The non-transitory computing device readable medium of claim 12, wherein the instructions when executed are further operable to:

determine component changes, create connections in the graph to indicate adjacency between starting and stopping components of the component changes, and flag components associated with the component changes; and determine geometry changes that occur between template drops by comparing components of each template drop with adjacent components in a preceding template drop of the ordered list or a subsequent template drop of the ordered list, and flagging components associated with the geometry changes.

16. The non-transitory computing device readable medium of claim 12, wherein the instructions that are operable to determine gaps or overlaps between adjacent components comprise instructions that when executed are operable to:

determine changes to lengths or slopes of line segments of adjacent components indicated in the graph that exceed a change detection threshold;

determine components in a same layer that are horizontally adjacent lack overlapping or shared vertical edges;

determine components of different layers that are vertically adjacent lack overlapping or shared horizontal edges; and determine components that overlap area of another component.

17. A computing device configured to detect anomalies and/or changes in a three-dimensional (3D) roadway model, the computing device comprising:

a processor; and a memory coupled to the processor, the memory configured to maintain anomaly and change detection software that is configured to:

extract a plurality of template drops from the three-dimensional (3D) roadway model at locations along a horizontal alignment to produce an ordered list of template drops;

construct a graph indicating adjacency between components whose cross sections are represented in the template drop;

expand the graph to also indicate adjacency of components between template drops by matching the components of each template drop with components in a preceding template drop or a subsequent template drop of the ordered list and identify any continuation of components;

determine gaps or overlaps between adjacent components indicated in the graph by comparing line segments of adjacent components, and flagging components with line segments that differ in geometry by more than a threshold amount or lack overlapping line segments; and display a visualization of the 3D roadway model including indications of the flagged components.

18. The computing device of claim 17, wherein the anomaly and change detection software is further configured to:

for each template drop of the ordered list, determine components that have inconsistent depth in the template drop by comparing distance between top and bottom line segments of components, and flagging components that have inconsistent depth.

19. The computing device of claim 17, wherein the anomaly and change detection software is further configured to:
- determine component changes, create connections in the graph to indicate adjacency between starting and stopping components of the component changes, and flag components associated with the component changes; and
- determine geometry changes that occur between template drops by comparing components of each template drop with adjacent components in a preceding template drop of the ordered list or a subsequent template drop of the ordered list, and flagging components associated with the geometry changes.

20. The computing device of claim 17, wherein the anomaly and change detection software is further configured to:
- determine changes to lengths or slopes of line segments of adjacent components indicated in the graph that exceed a change detection threshold;
- determine components in a same layer that are horizontally adjacent lack overlapping or shared vertical edges;
- determine components of different layers that are vertically adjacent lack overlapping or shared horizontal edges; and
- determine components that overlap area of another component.

\* \* \* \* \*